(12) United States Patent
Nakahama et al.

(10) Patent No.: US 10,317,513 B2
(45) Date of Patent: Jun. 11, 2019

(54) METHOD AND DEVICE FOR DISPLAYING INFORMATION

(71) Applicant: FURUNO ELECTRIC CO., LTD., Nishinomiya (JP)

(72) Inventors: Masahiro Nakahama, Nishinomiya (JP); Takatsugu Kubo, Nishinomiya (JP)

(73) Assignee: FURUNO ELECTRIC CO., LTD., Nishinomiya (JP)

(*) Notice: Subject to any disclaimer, the term of this patent is extended or adjusted under 35 U.S.C. 154(b) by 288 days.

(21) Appl. No.: 15/250,578

(22) Filed: Aug. 29, 2016

(65) Prior Publication Data
US 2017/0067984 A1    Mar. 9, 2017

(30) Foreign Application Priority Data

Sep. 8, 2015  (JP) ................... 2015-176239

(51) Int. Cl.
*G01S 7/06*    (2006.01)
*G01S 7/10*    (2006.01)
(Continued)

(52) U.S. Cl.
CPC ............. *G01S 7/24* (2013.01); *G01S 7/062* (2013.01); *G01S 7/10* (2013.01); *G01S 7/12* (2013.01);
(Continued)

(58) Field of Classification Search
CPC ..... G01S 7/24; G01S 7/12; G01S 7/10; G01S 13/726; G01S 13/9307; G01S 7/062; G01S 7/22
(Continued)

(56) References Cited

U.S. PATENT DOCUMENTS 3,717,873 A    2/1973  Riggs
3,939,334 A *  2/1976  Roth ................... G01S 13/9307
                                                         701/301
(Continued)

FOREIGN PATENT DOCUMENTS

JP    51-32475    9/1976
JP    2786809 B2  8/1998
(Continued)

OTHER PUBLICATIONS

European Search Opinon on EP3141924, dated Feb. 6, 2017 (Year: 2017).*
(Continued)

*Primary Examiner* — Frank J McGue
(74) *Attorney, Agent, or Firm* — Knobbe, Martens, Olson & Bear, LLP (57) ABSTRACT

An information display device (100) is provided, which includes a distance setting module (20) configured to set a distance, a closest approach position estimating module (32) configured to estimate a closest approach position (Psa, Psb) of a first ship (S) and a closest approach position (Pa, Pb) of a second ship (Ea, Eb) at a time point when the first and second ships (S, Ea, Eb) approach each other the closest, based on navigational information of the ships (S, Ea, Eb), and a display controlling module (35) configured to cause a display screen to display the estimated closest approach position (Pa, Pb) of the second ship (Ea, Eb), a risk area (Aa, Ab), and current positions of the ships (S, Ea, Eb), the risk area (Aa, Ab) formed into a circle based on the set distance, centering on the estimated closest approach position (Psa, Psb) of the first ship (S).

15 Claims, 7 Drawing Sheets

(51) Int. Cl.
*G01S 7/12* (2006.01)
*G01S 7/22* (2006.01)
*G01S 7/24* (2006.01)
*G01S 13/72* (2006.01)
*G01S 13/93* (2006.01)

(52) U.S. Cl.
CPC .............. *G01S 7/22* (2013.01); *G01S 13/726* (2013.01); *G01S 13/9307* (2013.01)

(58) Field of Classification Search
USPC .......................................................... 342/181
See application file for complete search history.

(56) References Cited

U.S. PATENT DOCUMENTS

| | | |
|---|---|---|
| 4,313,115 A | 1/1982 | O'Sullivan |
| 5,515,287 A | 5/1996 | Hakoyama et al. |
| 5,969,665 A * | 10/1999 | Yufa .................. G01S 13/9307 342/41 |
| 2006/0290562 A1* | 12/2006 | Ehresman ................ G08G 3/02 342/41 |
| 2008/0009269 A1* | 1/2008 | Ricci ................. H04M 3/42102 455/412.1 |

FOREIGN PATENT DOCUMENTS

| | | | | |
|---|---|---|---|---|
| JP | 2012-021947 A | | 2/2012 | |
| JP | 2012021947 | * | 2/2012 | .............. G01S 7/04 |
| WO | WO 2008/009269 A1 | | 1/2008 | |

OTHER PUBLICATIONS

Extended European Search Report for Application No. EP 16 18 6525, dated Feb. 6, 2017 in 7 pages.

* cited by examiner

METHOD AND DEVICE FOR DISPLAYING INFORMATION

CROSS-REFERENCE TO RELATED APPLICATION(S)

This application claims priority under 35 U.S.C. § 119 to Japanese Patent Application No. 2015-176239, which was filed on Sep. 8, 2015, the entire disclosure of which is hereby incorporated by reference.

TECHNICAL FIELD

This disclosure generally relates to an information display device for a ship, specifically to displaying information in order to avoid a collision between ships.

BACKGROUND

Conventionally, ship navigation assisting devices are known, which track ships based on information from a radar, obtain and display vectors of movements of the ships, and obtain a collision risk between one of the ships and a target ship (second ship) and a collision risk range. JP2012-021947A, JP1976-032475A and JP2786809B disclose such type of devices.

The navigation assisting device of JP2012-021947A causes an operation unit to calculate Closest Point of Approach (CPA) and Time to CPA (TCPA) at each given location on an estimated course, by using a detected target object image obtained by a radar antenna part, first-ship information, second-ship information, and estimated course information. The navigation assisting device further determines based on a result of the calculation (based on an estimated collision position) whether an alarm is required, and causes a display unit to display a risk symbol according to a result of the determination.

The operation evaluating device of a movable body (particularly a ship) in JP1976-032475A displays relative positions of an estimated path of the ship (first ship) to a collidable point with a target ship (second ship) and a collidable region centering on the collidable point, the collidable point being calculated based on coordinates and velocity component data of the target ship with respect to the first ship.

The ship navigation assisting device of JP2786809B obtains vertexes of a polygonally-shaped safety navigation area set around a first ship and a collision point with a target ship based on a relative position and a velocity vector of the target ship and a speed of the first ship, and calculates, as first-ship mapping positions, positions of the first ship when the respective vertexes correspond to the collision point. The ship navigation assisting device connects each other the first-ship mapping position for each calculated collision point by a line segment, displays the range defined by the line segment as a collision risk range, and superimposes the first-ship position and one of a velocity vector and a target ship position thereon.

However, with the configuration of JP2012-021947A, regarding the estimated collision position, a risk of colliding with the approaching second ship is notified to a helmsman simply by a change in color of a symbol of the first ship on a display screen or an audio alarm. In other words, on the display screen of JP2012-021947A, only the information indicating the risk of collision with a currently-scheduled course of the first ship is displayed. As a result, when the helmsman performs a course change steering operation (to avoid the risk), it is difficult for him/her to determine whether to change a ship speed or a heading, and, in the case of changing the heading, which direction to change it to. Further, there is also a case where a plurality of second ships are in the risk of colliding with the first ship, and it may be difficult to grasp an order of risk occurrence with among the second ships in terms of time. In such a situation, the steering operation becomes more difficult.

In this regard, in JP1976-032475A and JP2786809B, the area where there is a risk of the first ship colliding with the second ship if the first ship enters (i.e., the collidable region in JP1976-032475A and the collision risk range in JP2786809B) are displayed. Therefore, the helmsman can easily steer the ship to avoid the risk by referring to the area.

However, both the collidable region in JP1976-032475A and the collision risk range in JP2786809B are obtained based on a course of the target ship and displayed on the course of the target ship. As a result, when a plurality of target ships exist, since each target ship has a different course from the other, the helmsman easily receives a disorganized impression from the plurality of displayed collidable regions (collision risk ranges), and it is not easy to grasp a priority order for the helmsman to focus on among the collidable regions (collision risk ranges). Therefore, it is difficult to say that the helmsman can suitably and accurately steer the ship to avoid the risk by using either of the configurations of JP1976-032475A and JP2786809B.

SUMMARY AND EFFECTS

The purpose of this disclosure relates to providing an information display device, which allows an easy and accurate steering operation to avoid a risk, based on displayed information.

According to one aspect of the present disclosure, an information display device with the following configuration is provided. Specifically, the device includes a distance setting module configured to set a distance, a closest approach position estimating module configured to estimate a closest approach position of a first ship and a closest approach position of a second ship at a time point when the first and second ships approach each other the closest, based on navigational information of the first and second ships, and a display controlling module configured to cause a display screen to display the estimated closest approach position of the second ship, a risk area, and current positions of the first and second ships, the risk area formed into a circle based on the set distance, centering on the estimated closest approach position of the first ship.

Thus, a positional relationship of the first ship with the second ship having a risk of collision can be displayed in an easily understandable manner. Therefore, a helmsman of the first ship can intuitively grasp the positional relationship and steer the ship to avoid the collision, etc. with the second ship easily and accurately. Particularly when there are a plurality of second ships having the risk of collision with the first ship, risk areas corresponding to the second ships, respectively, are displayed in line on a course of the first ship. Therefore, the helmsman can easily grasp a priority order for him/her to focus on, based on distances from the respective risk areas to the current position of the first ship. Moreover, even when a large number of risk areas exist, they can be displayed in line (an organized manner), it can be avoided that the helmsman easily receives a disorganized impression from the displayed contents. Further since the risk area is acquired simply based on the closest approach position of the first ship and the set distance, the risk area can easily be recalculated according to a change of the navigational information (course, speed, etc.) of the second ship and the first ship, and thus, the calculation load of the device can be reduced.

The display controlling module may cause the display screen to display a closest approach period of time that is an estimated period of time until the first and second ships reach the closest approach positions, respectively.

Thus, the time period until the risk of, for example, the collision of the second ship with the first ship occurs can be grasped. Therefore, the helmsman can steer the ship to avoid the risk at a suitable timing.

The display controlling module may cause the display screen to display the closest approach time period near one of the closest approach positions.

Thus, when the closest approach positions of the plurality of second ships are displayed simultaneously, the correspondence of each closest approach position to the closest approach time period thereof can easily be understood.

The display controlling module may cause the display screen to display a predicted track of the second ship as a line connecting the current position and the closest approach position of the second ship.

Thus, the correspondence between each second ship and the closest approach position of the second ship can be displayed in an easily understandable manner. Further, the helmsman can intuitively grasp an entering direction of the second ship into the risk area of the first ship, and therefore, the ship can be steered to avoid the risk even more accurately.

The closest approach position of the second ship and the risk area may be displayed by the display controlling module when overlapped with each other.

Thus, since no excess content is displayed, the positional relationship of the first ship with the second ship having the risk of collision can be displayed simply.

The closest approach position of the second ship and the risk area may be displayed by the display controlling module when a closest approach period of time that is an estimated period of time until the first and second ships reach the closest approach positions, respectively, is below a given period of time.

Thus, the information is narrowed down to only the information which requires attention of the helmsman (information with the high risk) to be displayed, and as a result, an amount of displayed contents can be reduced.

The information display device may further include a target ship selecting module configured to select, in a case where the second ship includes a plurality of second ships, one of the displayed second ships to be a target ship. The display controlling module may cause the display screen to display in an emphasized manner the risk area corresponding to the selected target ship and the closest approach position of the target ship.

Thus, information regarding the second ship which the helmsman wants to confirm can be displayed explicitly, and as a result, the helmsman can easily confirm the information.

The information display device may further include a target ship selecting module configured to select, in a case where the second ship includes a plurality of second ships, one of the displayed second ships to be a target ship. Among the risk areas and the closest approach positions regarding the plurality of displayed second ships, the display controlling module may cause the display screen to only display the risk area corresponding to the selected target ship and the closest approach position of the selected target ship.

Thus, information regarding the second ship which the helmsman wants to confirm can be displayed simply and explicitly.

The display controlling module may cause the display screen to display a trace of at least one of the closest approach positions of the first and second ships, corresponding to a time lapse.

Thus, the helmsman can visually grasp a transition of the closest approach positions of the first ship and/or the second ship and easily steer the ship to avoid the risk.

In a case where the second ship includes a plurality of second ships, the display controlling module may cause the display screen to display the risk area and the closest approach position of the second ship, in different modes among the plurality of second ships.

Thus, when the plurality of second ships are displayed, they can be displayed so that the information of the first ship and the respective second ships are easily distinguished from each other. Further, it becomes easy to understand the correspondence between the first ship and each of the second ships.

In a case where the second ship includes a plurality of second ships having different levels of risk, the display controlling module may cause the display screen to display at least one of the risk area and the closest approach position of the second ship, in different modes among the plurality of second ships.

Thus, the risk of the respective second ships can be easily understood.

According to another aspect of the present disclosure, a following method of displaying information is provided. Specifically, the method includes estimating a closest approach position of a first ship and a closest approach position of a second ship at a time point when the first and second ships approach each other the closest, based on navigational information of the first and second ships, generating a risk area formed into a circle based on a set area distance, centering on the estimated closest approach position of the first ship, and displaying the estimated closest approach positions of the first and second ships, the generated risk area, and current positions of the first and second ships.

Thus, a positional relationship of the first ship with the second ship having a risk of collision can be displayed in an easily understandable manner. Therefore, a helmsman of the first ship can intuitively grasp the positional relationship and steer the ship to avoid the collision, etc. with the second ship easily and accurately. Particularly when there are a plurality of second ships having the risk of collision with the first ship, risk areas corresponding to the second ships, respectively, are displayed in line on a course of the first ship. Therefore, the helmsman can easily grasp a priority order for him/her to focus on, based on distances from the respective risk areas to the current position of the first ship. Moreover, even when a large number of risk areas exist, they are displayed in line (an organized manner), the helmsman does not receive a disorganized impression from the displayed contents. Further since the risk area is acquired simply based on the closest approach position of the first ship and the set distance, the risk area can easily be recalculated according to a change of the navigational information (course, speed, etc.) of the second ship and the first ship, and thus, the calculation load of a device using the above method can be reduced.

BRIEF DESCRIPTION OF THE DRAWING(S)

The present disclosure is illustrated by way of example and not by way of limitation in the figures of the accompanying drawings, in which like reference numerals indicate like elements and in which.

DETAILED DESCRIPTION

Figure 1:
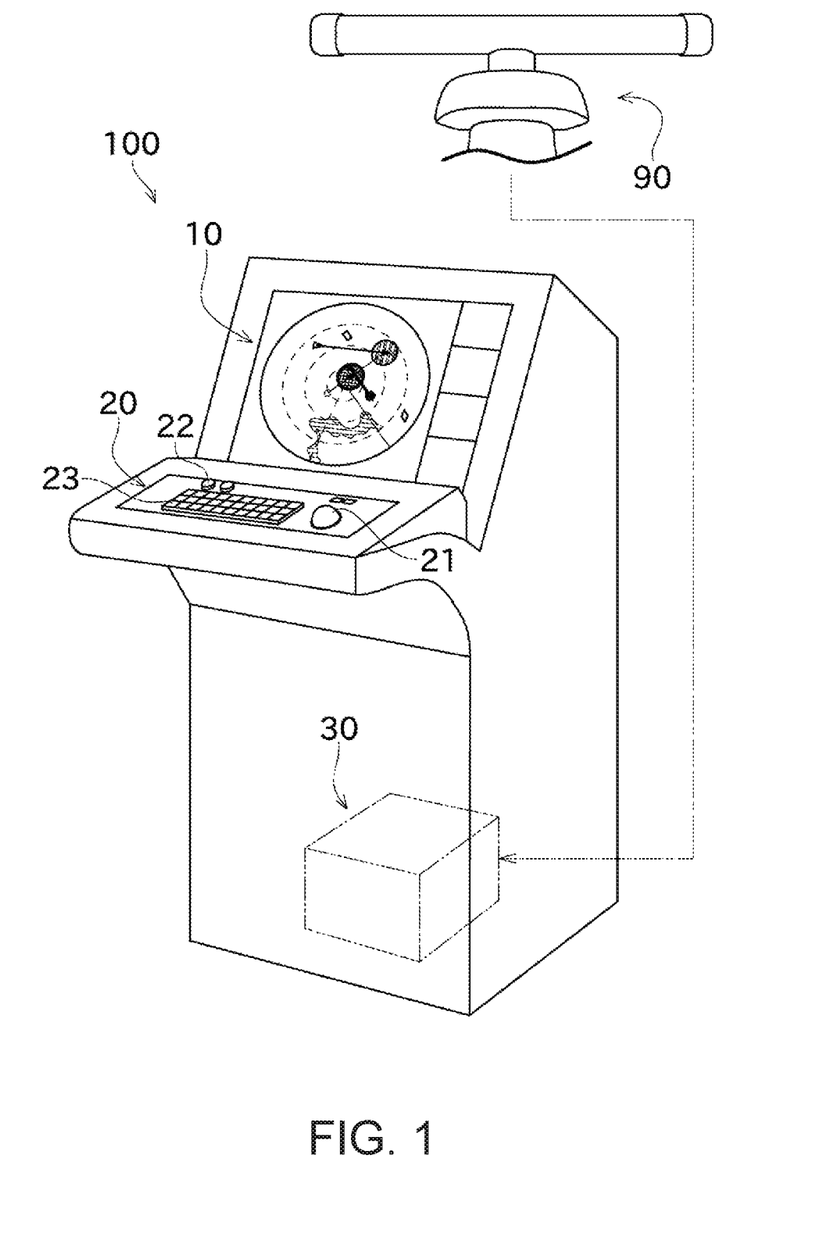
FIG. 1 is a perspective view schematically illustrating a configuration of a radar image display device according to one embodiment of this disclosure.
Figure 2:
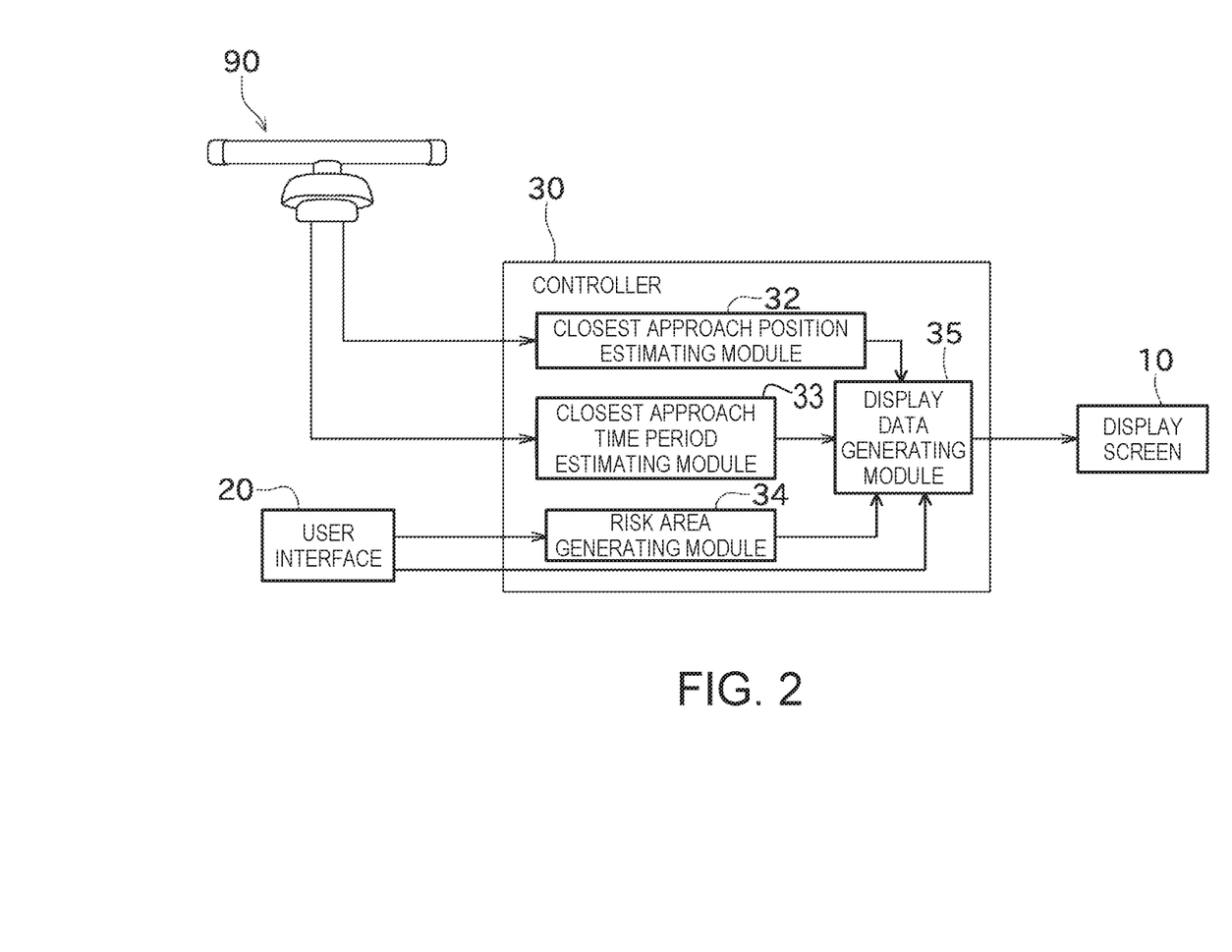
FIG. 2 is a function block diagram schematically illustrating a configuration of the radar image display device.
Figure 3:
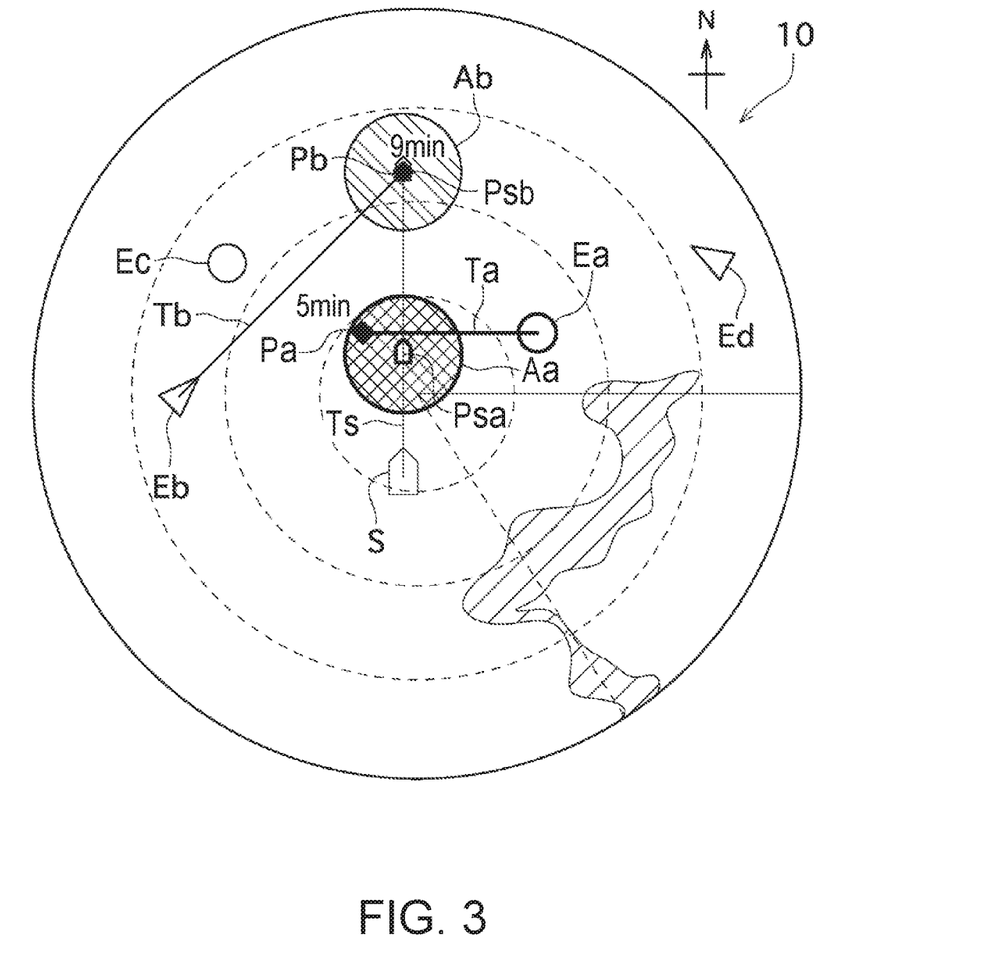
FIG. 3 is a view illustrating a display example of an image on a display screen of the radar image display device.

One embodiment of this disclosure is described with reference to the accompanying drawings. In the following embodiments, an example is illustrated in which the present disclosure is applied to a ship. However, the present disclosure may be applied to any other watercrafts including boats, vessels, and submarines. FIG. 1 is a perspective view schematically illustrating a configuration of a radar image display device 100. FIG. 2 is a function block diagram schematically illustrating a configuration of the radar image display device 100. FIG. 3 is a view illustrating a display example of an image on a display screen 10 of the radar image display device 100.

The radar image display device (information display device) 100 of FIG. 1 displays various information regarding a ship and has a Target Tracking (TT) function as a function to assist a navigation of the ship on which the radar image display device 100 is installed (hereinafter, this ship is simply referred to as "the ship" or "the first ship").

The TT function is for calculating a position, course and speed of, for example, another ship (second ship) located around the first ship based on information from a radar antenna 90, simulating an estimated course of the second ship from a current timing, a CPA indicating a closest approach distance between the first and second ships, a TCPA indicating a period of time until the first ship approaches the second ship the closest, etc., and issuing an alarm when there is a high risk of collision with the first ship.

The radar image display device 100 is electrically connected with the radar antenna 90, receives reception signals (information) from the radar antenna 90, creates a radar image reflecting states of detection target objects (second ship(s), island(s) etc. around the first ship, may simply be referred to as the "target object" hereinafter), and displays the radar image.

The radar antenna 90 is capable of rotating 360° in a horizontal plane. The radar antenna 90 transmits detection signals that are microwaves (e.g., electromagnetic waves) having a short wavelength, to scan a surrounding area of the first ship so as to detect information of the target objects. Specifically, the radar antenna 90 transmits the electromagnetic waves having a high directivity and receives reflection wave(s) from each target object.

Based on the information from the radar antenna 90, the radar image display device 100 obtains a distance from the first ship, a size, and an azimuth of the target object, creates the radar image, and displays it on the display screen (display unit) 10.

As illustrated in FIG. 1, the radar image display device 100 includes the display screen 10, a user interface (distance setting module, target ship selecting module) 20, and a controller 30.

The display screen 10 is constructed by, for example, a liquid crystal display screen. The display screen 10 displays the created radar image in response to a display command from the controller 30, and displays positions, tracks, closest approach positions, etc. of the first and second ships on, for example, the radar image.

The user interface 20 is disposed near the display screen 10, and includes user interface members, such as a trackball 21, buttons 22, a keyboard 23, and a dial. A helmsman of the first ship controls the user interface 20 to input various commands (e.g., setting of a distance defining a size of a risk area of the first ship, and specification of a target ship) to the radar image display device 100. Hereinafter, an area set to define the size of the risk area of the first ship may be referred to as the area distance.

As illustrated in FIG. 1, the controller 30 is configured as a computer built in the radar image display device 100. Further as illustrated in FIG. 2, the controller 30 includes a closest approach position estimating module 32, a closest approach time period estimating module 33, a risk area generating module 34, and a display data generating module (display controlling module) 35.

Specifically, the controller 30 includes an operator (e.g., CPU) and a memory (ROM(s), RAM(s), etc.). The memory stores various control programs, calculation information used in calculation by the operator, a given period of time used in comparison of a closest approach period of time (described later in detail), etc.

The control programs include an information display program which causes the radar image display device 100 to execute a closest approach position estimating process, a risk area generating process, and a displaying process which are executed by an information displaying method in one aspect of this disclosure. The hardware and software cooperate with each other to cause the controller 30 to operate as the closest approach position estimating module 32, the closest approach time period estimating module 33, the risk area generating module 34, the display data generating module 35, etc.

The closest approach position estimating module 32 calculates the closest approach positions of the first and second ships which are positions when they approach each other the closest, based on navigational information of the first ship and navigational information of the second ship. Note that, the closest approach positions may be calculated by a known method based on the navigational information of the first ship and the second ship.

In this embodiment, the navigational information of the first ship includes the positional information, the course information, the speed information, etc. of the first ship obtained based on the information from the radar antenna 90. However, without limiting to this, the course information and the speed information of the first ship may be obtained based on data regarding course information, speed information, etc. set by the helmsman.

The navigational information of the second ship includes the positional information, the course information, the speed information, etc. of the second ship obtained based on the information from the radar antenna 90. However, without limiting to this, the navigational information of the second ship may be acquired by using an Automatic Identification System (AIS).

The closest approach time period estimating module 33 calculates a closest approach period of time indicating an estimated period of time until the first and second ships reach the closest approach positions thereof, based on the closest approach positions estimated by the closest approach position estimating module 32, and a current position and speed of one of the first and second ships.

The risk area generating module 34 generates the risk area based on the area distance set by the helmsman via the user interface 20 and the navigational information of the first ship, and outputs it to the display data generating module 35. The risk area is defined based on a predicted position of the first ship for a particular timing yet to come, and is a rough indication that a risk of the first ship colliding with the second ship is high when a predicted position of the second ship is in the area at the particular timing.

In this embodiment, the risk area has a circular shape formed centering on the first ship position and by having a radius as the area distance set by the helmsman. Therefore, the risk area is generated by the simple processing, and thus, a calculation load is reduced.

The display data generating module 35 generates display data to be displayed on the display screen 10 based on the information from the closest approach position estimating module 32, the closest approach time period estimating module 33, the risk area generating module 34, and the user interface 20, and controls the display screen 10 to display the display data. Specifically, the display data generating module 35 outputs the display data (e.g., current positions of the first ship S and second ships Ea and Eb, closest approach positions Psa, Psb, Pa and Pb of the first and second ships, and risk areas Aa and Ab of the first ship) to the display screen 10 and, as illustrated in FIG. 3, controls the display screen 10 to two-dimensionally display the display data as marks, etc.

In the example of FIG. 3, the display data generating module 35 controls the display screen 10 to display positions of four second ships Ea, Eb, Ec and Ed and the closest approach positions Pa and Pb of two second ships Ea and Eb thereamong. Hereinafter, a timing at which the first and second ships approach each other the closest may be referred to as the "closest approach timing." The closest approach positions Pa and Pb of the second ships Ea and Eb indicate positions of the second ships Ea and Eb at closest approach timings thereof.

Further, the display data generating module 35 controls the display screen 10 to display the current position and the closest approach positions Psa and Psb of the first ship S. Note that, the closest approach positions Psa and Psb of the first ship S indicate positions of the first ship S at the closest approach timings obtained regarding the second ships Ea and Eb by which the first ship is approached, respectively. Moreover, the risk areas Aa and Ab based on the closest approach positions Psa and Psb of the first ship S are displayed on the display screen 10.

By looking at the information displayed on the display screen 10, the helmsman can accurately determine a manner of steering the first ship in order to avoid the risk. Hereinafter, the display of the information regarding the second ship Ea and the first ship S is described in detail as an example.

As illustrated in FIG. 3, the display screen 10 displays a mark of the first ship S (large ship-shaped mark) at the current position of the first ship S, and a mark of the second ship Ea (large circular mark) at the current position of the second ship Ea. Further, the display screen 10 displays the closest approach position Psa of the first ship S (the position of the first ship S at the closest approach timing regarding the first and second ships S and Ea) as a small ship-shaped mark, and the closest approach position Pa of the second ship Ea (the position of the second ship Ea at the closest approach timing described above) as a small rhombus mark. Note that, the closest approach position Psa of the first ship S and the closest approach position Pa of the second ship Ea are estimated by the closest approach position estimating module 32. Moreover, the display screen 10 displays the risk area Aa generated by the risk area generating module 34 based on the closest approach position Psa of the first ship S.

From the display screen illustrated in FIG. 3, the helmsman can understand the navigational information, such as the current positions, the closest approach positions, the courses, etc. of the first and second ships S and Ea. Further, the helmsman can grasp collision risk information, such as there is a risk that the first ship S collides with the second ship Ea if the first ship S continues to navigate at the current course and speed.

Specifically, the large ship-shaped mark is displayed to indicate the position at which the first ship S currently navigates. The small ship-shaped mark is displayed to indicate the position of the first ship S at the closest approach timing regarding the first and second ships S and Ea (closest approach position Psa). Therefore, the current position and the closest approach position Psa of the first ship S are easily grasped based on the large and small ship-shaped marks indicating the first ship S.

Similarly, the large circular mark described above is displayed to indicate the position at which the second ship Ea currently navigates. The small rhombus mark is displayed to indicate the position of the second ship Ea at the closest approach timing regarding the first and second ships S and Ea (closest approach position Pa). Therefore, the current position and the closest approach position Pa of the second ship Ea are easily grasped based on the two marks indicating the second ship Ea.

Note that, the marks indicating the current positions and the closest approach positions of the first ship S and the second ship Ea are not limited to be displayed in different shapes, but may be displayed in the same shape but different sizes. Further, the marks may be displayed in the same shape and size while the marks of the current positions are displayed in solid lines and the marks of the closest approach positions are displayed in dashed lines.

From the displayed contents of FIG. 3, based on the positional relationship between the circle of the risk area and the small rhombus mark, it is obvious that the second ship Ea is in the risk area Aa at the closest approach timing regarding the first and second ships S and Ea. Therefore, the helmsman can intuitively grasp from the display screen illustrated in FIG. 3, that there is the risk of the first ship S colliding with the second ship Ea if the first ship S continues to navigate at the current course and speed.

Thus, based on the information acquired from the display screen illustrated in FIG. 3, the helmsman can easily understand that the collision with the second ship Ea is avoidable by decelerating the first ship S or turning the heading of the first ship S to a right side of FIG. 3, for example.

Incidentally, when information regarding the plurality of second ships Ea to Ed is displayed, in the radar image display device 100 of this embodiment, as illustrated in FIG.

3, the second ships Ea to Ed are displayed as different marks (symbols) from each other as needed. Thus, when the plurality of second ships Ea to Ed are displayed, they are displayed so that the information of the second ships is easily distinguished from each other. In the display example of FIG. 3, the second ships Ea and Ec are the second ships tracked with the TT function and displayed as circular marks. On the other hand, the second ships Eb and Ed are the second ships acquired by the AIS and displayed as triangular marks. However, without limiting to this, each second ship may be displayed as a mark of any shape.

Further, the information regarding the second ships Ea and Eb which have the risk of colliding with the first ship S is displayed in different colors (modes) so that the helmsman can easily distinguish the information from each other. Note that in FIG. 3, different colors are expressed by changing the thickness of the lines.

Specifically, the second ship Ea, the closest approach position Pa thereof, and the closest approach position Psa and the risk area Aa of the first ship S corresponding to the second ship Ea are displayed in, for example, red, and the second ship Eb, the closest approach position Pb thereof, and the closest approach position Psb and the risk area Ab of the first ship S corresponding to the second ship Eb are displayed in, for example, yellow. In this manner, when the second ships Ea and Eb are displayed, they are displayed so that the information of the second ships Ea and Eb is easily distinguished from each other. As a result, the ship can be steered to avoid the risk more accurately.

Note that, the display modes of the closest approach positions Pa and Pb of the second ships are not limited to the above example. The marks indicating the closest approach positions Pa and Pb of the second ships are not limited to small rhombuses but each mark may be displayed in different shapes, sizes and/or colors according to the type of the second ship and/or risk of collision. Further, the colors of the risk areas Aa and Ab are also not limited to the above example, and may be changed according to the types of the second ships and/or risk of collision.

Note that, examples of the type of the second ship include the type tracked with the TT function and the type acquired by the AIS as described above. Further, as one example of the case where the color of the second ship is changed according to the risk, it can be considered to display the second ship in red when the CPA indicates below a given value and the TCPA indicates below a given value, in yellow when only the CPA indicates below the given value, and in blue otherwise.

As described above, in the radar image display device 100 of this embodiment, the risk areas Aa and Ab where the possibilities of the collision of the second ships Ea and Eb with the first ship S increase if they enter therein are generated centering on the closest approach positions Psa and Psb of the first ship S, respectively. That is, the risk areas Aa and Ab are always displayed centering on a point on the course of the first ship S.

Thus, even in a complex situation where there are the plurality of second ships Ea and Eb which require attention so as not to collide, the positional relationship of each of the displayed risk areas Aa and Ab with the current position of the first ship S can intuitively be grasped.

For example, as illustrated in FIG. 3, the risk areas Aa and Ab of the first ship S corresponding to the second ships Ea and Eb, respectively, are displayed in line on the course of the first ship S. From the display screen illustrated in FIG. 3, it can easily be understood that the risk area Aa is closer to the current position of the first ship S than the risk area Ab. Since the helmsman can intuitively understand that the risk of collision with the second ship Ea occurs before the risk of collision with the second ship Eb as above, he/she can easily grasp that the ship should first be steered prioritizing avoidance of the collision with the second ship Ea.

Further, as illustrated in FIG. 3, the closest approach time periods indicating estimated periods of time until the respective second ships Ea and Eb approach the first ship S the closest (the time periods until the respective closest approach timings) are displayed near the closest approach positions Pa and Pb thereof. These closest approach time periods are obtained by the closest approach time period estimating module 33.

As illustrated in FIG. 3, characters "5 min" indicating that the closest approach time period for the first ship S and the second ship Ea is five minutes are displayed near the closest approach position Pa of the second ship Ea, and characters "9 min" indicating that the closest approach time period for the first ship S and the second ship Eb is nine minutes are displayed near the closest approach position Pb of the second ship Eb. Thus, the correspondence of each closest approach time period to the second ship Ea or Eb can easily be understood and a current remaining length of time can be grasped. Therefore, the helmsman can steer the ship to avoid each risk at a suitable timing.

Incidentally, in a case where the displayed closest approach time periods are shorter than a given period of time, the attention of the helmsman may be attracted by, in addition to displaying the closest approach time periods described above, issuing an alarm sound, blinking the marks indicating the closest approach time periods, the closest approach positions Pa and Pb of the second ships Ea and Eb, and/or the risk areas Aa and Ab of the first ship S which correspond to the closest approach time periods. Note that, the given time period may be determined by the controller 30 based on the speed of the first ship S or set by the control of the helmsman.

Further, as illustrated in FIG. 3, straight lines (lines) connecting the current positions of the second ships Ea and Eb with the closest approach positions Pa and Pb thereof, respectively, are displayed. Since the closest approach positions Pa and Pb of the second ships Ea and Eb are estimated based on the navigational information of the second ships Ea and Eb, the lines may be used as predicted tracks Ta and Tb of the second ships Ea and Eb.

Thus, ease of visual recognition of the correspondence between the closest approach position Pa and the second ship Ea and the correspondence between the closest approach position Pb and the second ship Eb is increased. Further, the courses of the second ships Ea and Eb can be grasped more intuitively based on the predicted tracks Ta and Tb. Therefore, entering directions of the second ships Ea and Eb into the risk areas Aa and Ab of the first ship S can easily be estimated. As a result, the ship can be steered to avoid the risk even more accurately.

As generally known, in a congested sea area, a significantly large number of second ships are displayed on the display screen 10. If information regarding the large number of second ships is all displayed on the display screen 10 simultaneously, since the displayed contents of the display screen appear disorganized, it becomes more difficult for the helmsman to confirm the information regarding the respective second ships.

In this regard, with the radar image display device 100 of this embodiment, the closest approach positions and the risk areas to be displayed are narrowed down by a suitable condition. As a result, in FIG. 3, while the four second ships Ea to Ed are displayed, the displayed closest approach positions and the displayed risk areas are only of the two second ships Ea and Eb.

Hereinafter, the narrowing-down operation of the displayed contents is described in detail. When there is no closest approach position of the second ship located in the risk area based on the closest approach position of the first ship S corresponding thereto, the controller 30 of the radar image display device 100 controls the display screen 10 not to display any of the closest approach position of the first ship S, the closest approach position of the second ship, and the closest approach time period. In other words, with the radar image display device 100 of this embodiment, the information described above is displayed only when the closest approach position of the second ship is in (overlaps with) the risk area of the first ship S corresponding to the second ship concerned.

Figure 4:
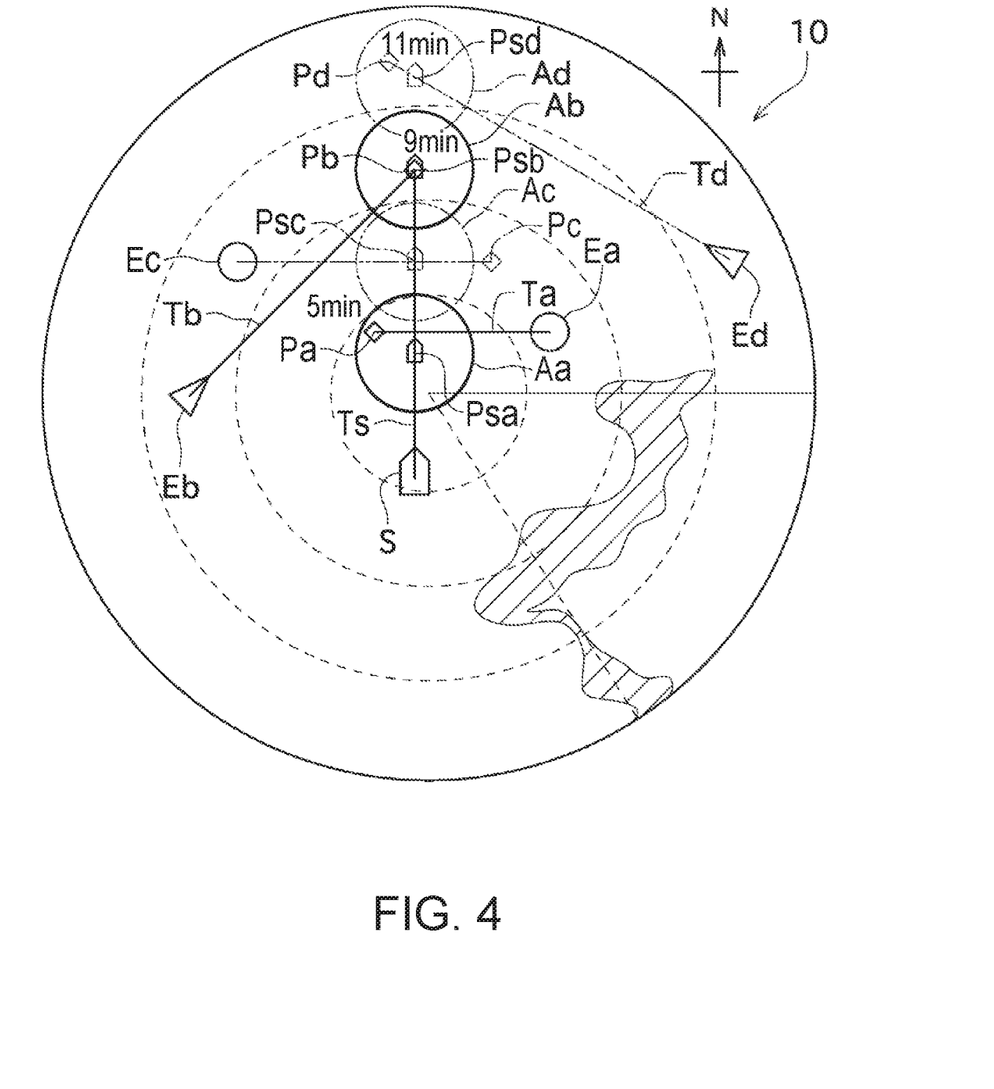
FIG. 4 is a view illustrating a narrowing-down operation of marks of closest approach positions and risk areas.

Specifically, as indicated by a chain line in FIG. 4 as an imaginary example, a closest approach position of the second ship Ec at a timing at which the second ship Ec approaches the first ship S the closest is outside a corresponding risk area Ac centering on a closest approach position Psc of the first ship S. This means that the risk of collision between the first and second ships S and Ec is currently low. Therefore, the controller 30 (display data generating module 35) controls the display screen 10 not to display the closest approach position Pc and an predicted track Tc of the second ship Ec, and the closest approach position Psc and the risk area Ac of the first ship S corresponding to the second ship Ec. Thus, the amount of displayed contents on the display screen 10 is reduced.

Moreover, with the radar image display device 100 of this embodiment, the narrowing-down operation of the displayed contents is also performed based on the time period until the first and second ships approach each other the closest.

Specifically, the controller 30 first acquires from the memory a given time period (e.g., ten minutes) set to determine whether to display the closest approach positions and the risk area. Then, regarding the second ships Ea, Eb and Ed of which closest approach positions are in the respective risk areas, the controller 30 compares the closest approach time period obtained by the closest approach time period estimating module 33 with the given time period described above. As indicated by another chain line in FIG. 4 as an imaginary example, although the closest approach position Pd of the second ship Ed is in a corresponding risk area Ad centering on a closest approach position Psd of the first ship S, the closest approach time period is eleven minutes, which exceeds the given time period (ten minutes). Therefore, the controller 30 (display data generating module 35) controls the display screen 10 not to display the closest approach positions Pd and Psd of the second ship Ed and the first ship S, the risk area Ad of the first ship S centering on the closest approach position Psd, and the closest approach time period. On the other hand, regarding the rest of the other second ships Ea and Eb, the controller 30 (display data generating module 35) controls the display screen 10 to display the closest approach positions Pa and Pb of the second ships Ea and Eb, the closest approach positions Psa and Psb of the first ship S, the risk areas Aa and Ab of the first ship S centering on the closest approach positions Psa and Psb, and the closest approach time periods.

By the controller 30 performing the above processing, especially when there is a possibility of colliding with a plurality of second ships, according to the risk based on the time periods until the collision occurs, the controller 30 controls the display screen 10 to selectively display the information, such as the closest approach positions. Thus, the amount of displayed contents on the display screen 10 is reduced more.

Figure 5:
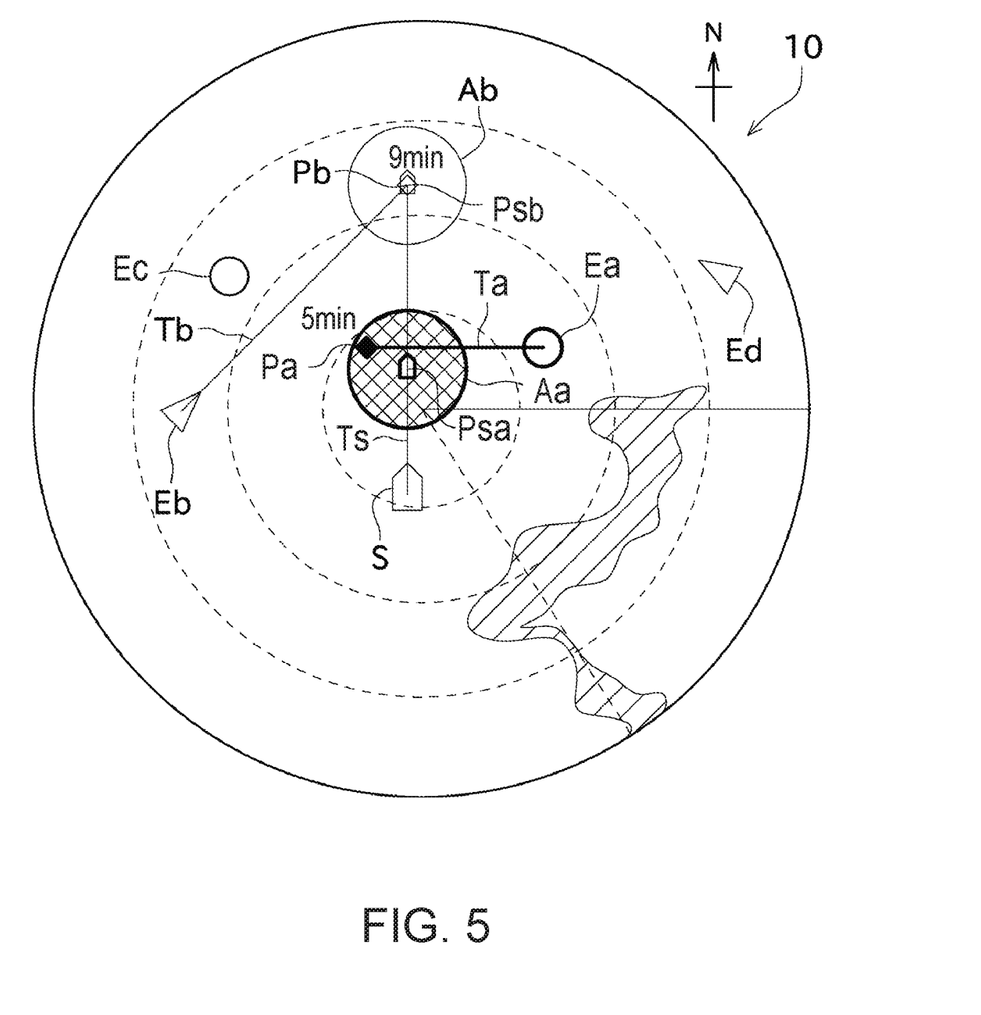
FIG. 5 is a view illustrating an example in which a closest approach position and a risk area regarding a selected ship are displayed in an emphasized manner.

Further, with the radar image display device 100 of this embodiment, the helmsman may also control the user interface 20 to display information regarding a selected target ship in an emphasized manner. For example, when the helmsman selects the second ship Ea through the user interface 20, the controller 30 (display data generating module 35) considers the second ship Ea as the target ship, generates display data so that the information regarding the second ship Ea is expressed in different color/type of line from the information regarding the other second ship Eb, and outputs the display data to the display screen 10. As a result, the information regarding the target ship (second ship) Ea selected by the helmsman is displayed to stand out more than the information regarding the second ship Eb, as illustrated in FIG. 5.

Note that, examples of the method of causing the information regarding the second ship Ea to stand out include displaying the information in a color which easily attracts attention of the helmsman, displaying the information to blink, and displaying the information regarding the target ship in a chromatic color or by a solid line while displaying the information regarding the other second ship in an achromatic color (e.g., gray) or by a dashed line.

Further, instead of displaying the closest approach position and the predicted track regarding the second ship other than the second ship Ea (target ship), the information regarding the second ship Ea may be displayed alone. In this case, the amount of displayed contents on the display screen 10 is reduced more and the information regarding the second ship which the helmsman wants to confirm is displayed more explicitly, and the helmsman can easily confirm the information.

With the radar image display device 100 of this embodiment, as described above, the information regarding the second ships Ea and Eb and the first ship S, which is for preventing the collision, is displayed so that the correspondence thereof and the priority order for the helmsman to focus on are easily grasped. Therefore, the helmsman can easily and accurately steer the ship to avoid the risk.

Figure 6:
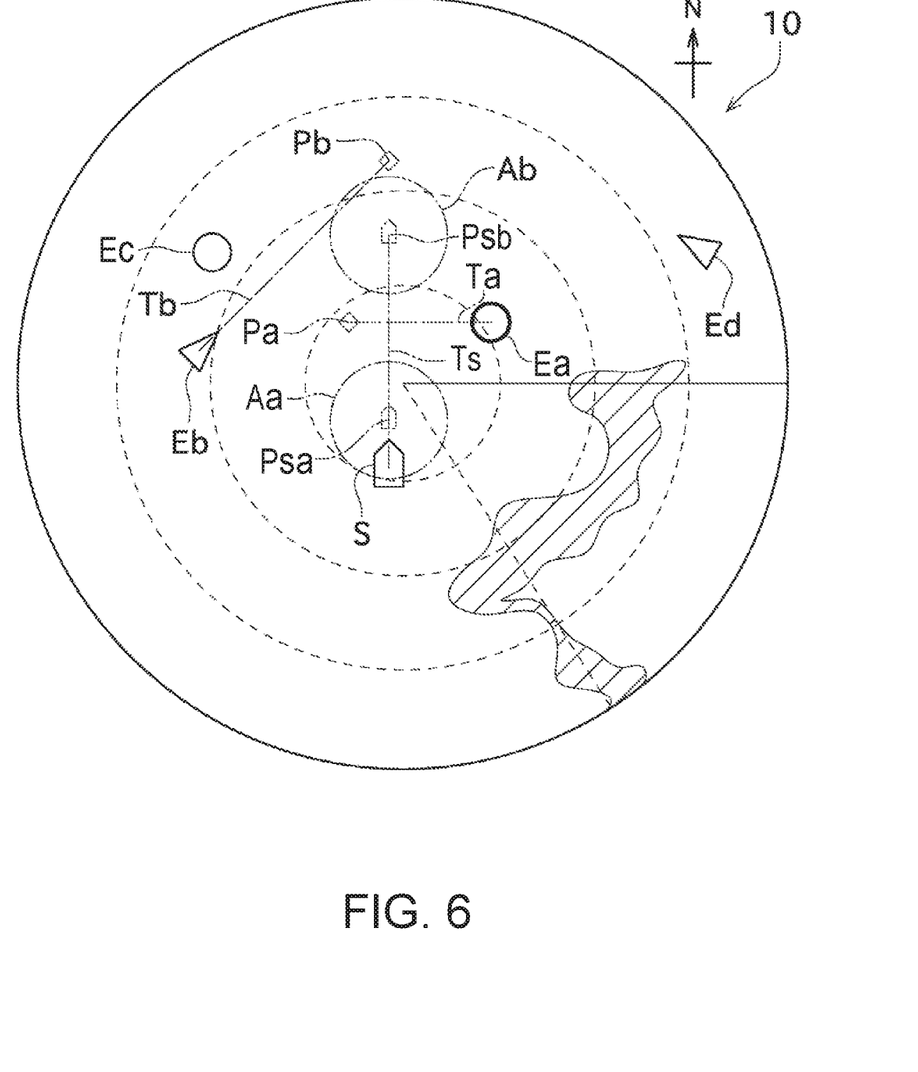
FIG. 6 is a view illustrating a situation where a first ship decelerates from the state of FIG. 3.

For example, in the situation of FIG. 3, the closest approach position Pa of the second ship Ea corresponding to the first ship S is, in the risk area Aa centering on the closest approach position Psa of the first ship S, farther than the closest approach position Psa with respect to the current position of the first ship S. In this case, it can be considered that the collision can easily be avoided by decelerating the first ship S rather than accelerating. FIG. 6 illustrates a situation where the risk area Aa shifts in position due to the deceleration of the first ship S and the closest approach position Pa of the second ship Ea shifts outside the risk area Aa. Note that, once the closest approach positions Pa and Pb of the second ships Ea and Eb shift outside the risk areas Aa and Ab, although the closest approach positions Psa and Psb of the first ship, the closest approach positions Pa and Pb of the second ship, and the risk areas Aa and Ab are usually no longer displayed on the display screen, these are illustrated in FIG. 6 by chain lines as an imaginary example. As described above, when the closest approach positions Pa and Pb of the second ships Ea and Eb enter the risk areas Aa and Ab centering on the closest approach positions Psa and Psb of the first ship S, the helmsman can avoid the collision accurately by steering the ship to intentionally shift the closest approach positions Pa and Pb of the second ships Ea and Eb to the outside of the risk areas Aa and Ab, respectively.

Note that, a previous closest approach positions Psa and Psb of the first ship S based on the navigational information of the first ship S and the second ships Ea and Eb which are worth a given period of time before the current timing may be stored and traces of the closest approach positions Psa and Psb corresponding a time lapse may be displayed on the display screen 10 so that the helmsman can easily confirm (trace display mode).

Hereinafter, the display operation of the trace of the closest approach position Psa of the first ship S corresponding to the second ship Ea is described as an example. In an example of the display screen illustrated in FIG. 7 in a simplified manner, a transition of the closest approach position Psa of the first ship S over time is displayed. Note that, in FIG. 7, the current closest approach position is Psa, a closest approach position a given period of time before a current timing is P'sa, and a closest approach position another given period of time further before is P''sa are illustrated. The mark indicating the closest approach position may be displayed by changing its color so that it approaches a background color as the corresponding timing of the mark is earlier (in FIG. 7, for the sake of convenience, the difference of the displayed color is expressed by a difference in hatching density).

Figure 7:
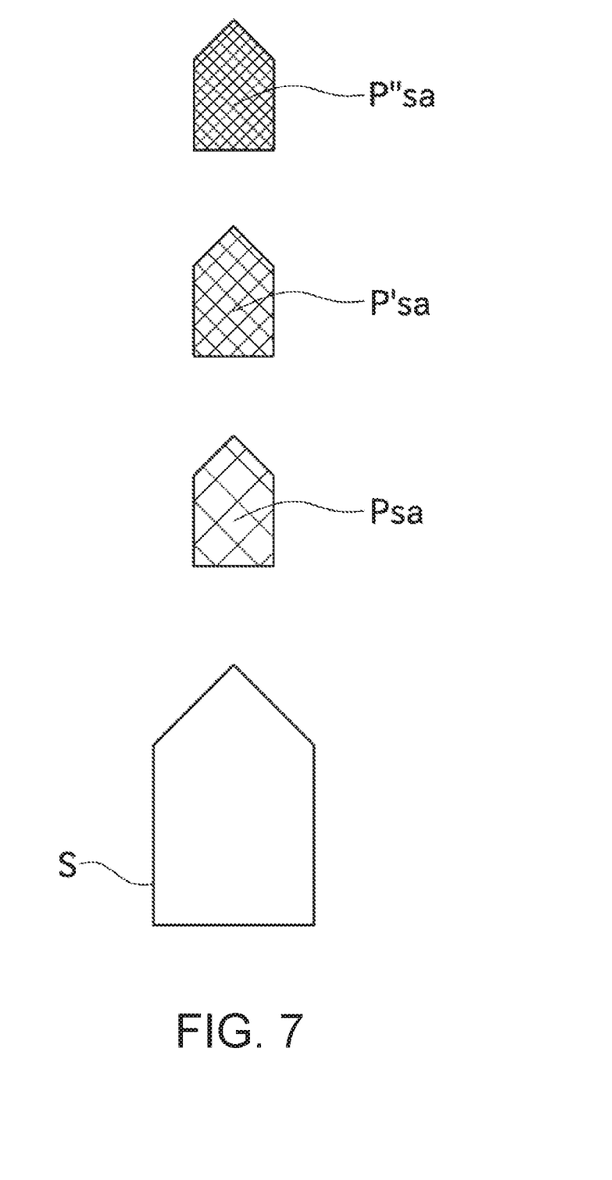
FIG. 7 is a schematic view illustrating a display example of a trace of the closest approach position of the first ship.

Since the display data generating module 35 controls the display screen 10 to display the transition of the closest approach position Psa of the first ship S over time, the time change of the closest approach position Psa is expressed. Therefore, the helmsman can easily determine whether the risk can be avoided without changing the current steering operation or an additional operation is required, etc.

Moreover, without limiting to displaying the trace of the closest approach position of the first ship S, a trace of the closest approach position of the second ship corresponding to the time lapse may be displayed. By displaying the time change of the closest approach position of the second ship as a trace, the movement of the second ship can suitably be grasped and a course change steering operation can be performed more accurately.

As described above, the radar image display device 100 of this embodiment includes the user interface 20, the closest approach position estimating module 32, and the display data generating module 35. The user interface 20 sets the distance (area distance). The closest approach position estimating module 32 estimates the closest approach positions Pa and Pb of the second ships Ea and Eb and the closest approach positions Psa and Psb of the first ship S for the timing at which the second ships Ea and Eb approach the first ship S the closest, based on the navigational information of the second ships Ea and Eb and the navigational information of the first ship S. The display data generating module 35 displays the closest approach positions Pa and Pb of the second ships Ea and Eb estimated by the closest approach position estimating module 32, the risk areas Aa and Ab centering on the closest approach positions of the first ship S, and the current positions of the second ships Ea and Eb and the first ship S.

Thus, the positional relationships of the first ship S with the second ships Ea and Eb having the risk of collision are displayed in an easily understandable manner. Therefore, the helmsman can intuitively grasp the positional relationships and steer the ship to avoid the collision, etc. with the second ships Ea and Eb easily and accurately. Particularly when there are the plurality of second ships having the risk of collision with the first ship S, the risk areas Aa and Ab corresponding to the second ships Ea and Eb, respectively, are displayed in line on the course of the first ship S. Therefore, the helmsman can easily grasp the priority order for him/her to focus on, based on the distances from the respective risk areas Aa and Ab to the current position of the first ship S. Moreover, even when a large number of risk areas exist, they are displayed in line (an organized manner), the helmsman does not easily receive a disorganized impression from the displayed contents. Further since the risk areas Aa and Ab are acquired simply based on the closest approach positions of the first ship S and the set distance, the risk areas Aa and Ab may easily be recalculated according to a change of the navigational information (course, speed, etc.) of the second ships Ea and Eb and the first ship S, and thus, the calculation load is reduced.

Although the embodiment of this disclosure is described above, the above configuration may be modified as follows, for example.

In the above embodiment, the area distance is set by the control of the helmsman. However, without limiting to this, for example, the controller 30 may automatically set the area distance according to the speed of the first ship.

Moreover, the marks indicating the second and first ships may have any shape which can express the courses of the second and first ships (arrow, triangle, ship shape, etc.). Thus, the courses of the second and first ships can easily be grasped based on the shapes of the marks.

The display screen of the above embodiment may display a risk area centering on a current position of the first ship.

The marks of the closest approach positions Psa and Psb of the first ship may be omitted. Even in this case, the closest approach positions of the first ship are always at the centers of the risk areas Aa and Ab, respectively. Therefore, the helmsman can easily grasp the closest approach positions of the first ship.

The previous transition of the closest approach position of the first ship may be expressed by, for example, a line, instead of the plurality of marks as FIG. 7. This may similarly be applied to the previous transition of the closest approach position of the second ship as well.

The display mode of the closest approach time period may arbitrarily be changed. For example, instead of displaying the closest approach time period as characters (number) as described above, it may be displayed as a bar chart or a circle chart.

In the above embodiment, the set area distance is considered to be the radius of the risk area. However, alternatively, a distance corresponding to a diameter of the circular risk area may be set as the area distance.

The display screen 10 may display velocity vectors of the second ships Ta and Tb, instead of/in addition to the predicted tracks Ta and Tb of the second ships.

A display range in distance may be set in addition to the area distance so that even when the closest approach positions Pa and Pb of the second ships are outside the risk areas Aa and Ab, if distances of the closest approach positions Pa and Pb from the closest approach positions Psa and Psb of the first ship, respectively, are within the display range, the closest approach positions Pa and Pb of the second ships, the closest approach positions Psa and Psb of the first ship, and the risk areas Aa and Ab are displayed.

Although the description of the above embodiment is given based on the North-up orientation, the display operation in this disclosure may be performed based on a heading-up orientation.

This disclosure is applicable to various kinds of information display devices, for example, an information display device dedicated for a radar connected with a radar antenna, and a multi-function display capable of integrally displaying various information (e.g., information of a nautical chart).

TERMINOLOGY

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. An information display device, comprising:
   a distance setting module configured to set a distance;
   a closest approach position estimating module configured to estimate a closest approach position of a first ship and each of a plurality of second ships at a time point when the first ship and each of the plurality of second ships approach each other the closest, based on navigational information of the first and second ships from the plurality of second ships; and
   a display controlling module configured to cause a display screen to display the estimated closest approach position of each ship of a first subset of ships from the plurality of second ships, a risk area for each ship of the first subset of ships, and current positions of the first ship and each ship of the first subset of ships, the risk area formed into a circle based on the set distance, centering on the estimated closest approach position of the first ship, wherein the display controlling module is further configured to prevent the display of the estimated closest approach position and a risk area of each ship of a second subset of ships from the plurality of second ships, wherein the first subset of ships comprise ships determined to be within the risk area at a point in time when closest to the first ship and the second subset of ships comprise ships determined to not be within the risk area at a point in time when closest to the first ship.

2. The information display device of claim 1, wherein the display controlling module causes the display screen to display a closest approach period of time that is an estimated period of time until the first ship and a ship from the first subset of ships reach the closest approach positions, respectively.

3. The information display device of claim 2, wherein the display controlling module causes the display screen to display the closest approach time period near one of the closest approach positions.

4. The information display device of claim 1, wherein the display controlling module causes the display screen to display a predicted track of a ship from the first subset of ships as a line connecting the current position and the closest approach position of the ship from the first subset of ships.

5. The information display device of claim 1, wherein the closest approach position for each ship of the first subset of ships and the risk area for each ship of the first subset of ships are displayed by the display controlling module when overlapped with each other.

6. The information display device of claim 1, wherein the closest approach position for each ship of the first subset of ships and the risk area for each ship of the first subset of ships are displayed by the display controlling module when a closest approach period of time that is an estimated period of time until the first ship the ship of the first subset of ships reach the closest approach positions, respectively, is below a given period of time.

7. The information display device of claim 1, further comprising a target ship selecting module configured to select one of the ships of the first subset of ships to be a target ship,
   wherein the display controlling module causes the display screen to display in an emphasized manner the risk area corresponding to the selected target ship and the closest approach position of the target ship.

8. The information display device of claim 1, further comprising a target ship selecting module configured to select one of the ships of the first subset of ships to be a target ship,
   wherein, among the risk areas and the closest approach positions of the first subset of ships, the display controlling module causes the display screen to only display the risk area corresponding to the selected target ship and the closest approach position of the selected target ship.

9. The information display device of claim 1, wherein the display controlling module causes the display screen to display a trace of at least one of the closest approach positions of the first ship and a ship from the first subset of ships, corresponding to a time lapse.

10. The information display device of claim 1, wherein the display controlling module causes the display screen to display the risk area and the closest approach position of at least one ship of the first subset of ships, in a different mode than at least one other ship from the first subset of ships.

11. The information display device of claim 1, wherein each ship of the first subset of ships is associated with different levels of risk, and the display controlling module causes the display screen to display at least one of the risk area and the closest approach position of a ship from the first subset of ships, in a different mode than at least one other ship from the first subset of ships.

12. The information display device of claim 1, wherein the first subset of ships comprises one or more ships.

13. The information display device of claim 1, wherein the second subset of ships comprises one or more ships.

14. An information display device, comprising a processor programmed to at least:
   set a distance,
   estimate a closest approach position of a first ship and each of a plurality of second ships at a time point when the first ship and each of the plurality of second ships approach each other the closest, based on navigational information of the first and second ships from the plurality of second ships,
   cause a display screen to display the estimated closest approach position of each ship of a first subset of ships from the plurality of second ships, a risk area for each ship of the first subset of ships, and current positions of the first ship and each ship of the first subset of ships, the risk area formed into a circle based on the set distance, centering on the estimated closest approach position of the first ship, and omit the display of the estimated closest approach position and a risk area of each ship of a second subset of ships from the plurality of second ships, wherein the first subset of ships comprise ships determined to be within the risk area at a point in time when closest to the first ship and the second subset of ships comprise ships determined to not be within the risk area at a point in time when closest to the first ship.

15. A method of displaying information, comprising:

estimating a closest approach position of a first ship and each of a plurality of second ships at a time point when the first and second ships approach each other the closest, based on navigational information of the first ship and each of the plurality of second ships;

generating a risk area for each ship of a first subset of ships from the plurality of second ships formed into a circle based on a set area distance, centering on the estimated closest approach position of the first ship;

displaying the estimated closest approach positions of the first ship and each ship of the first subset of ships, the generated risk area for each ship of the first subset of ships, and current positions of the first ship and each ship of the first subset of ships; and omitting the display of the estimated closest approach position and a risk area of each ship of a second subset of ships from the plurality of second ships, wherein the first subset of ships comprise ships determined to be within the risk area at a point in time when closest to the first ship and the second subset of ships comprise ships determined to not be within the risk area at a point in time when closest to the first ship.

* * * * *